May 28, 1946.  A. E. BRICKMAN  2,401,045
METHOD OF PRODUCING A RENEWABLE TREAD TIRE
Filed Jan. 8, 1943  2 Sheets-Sheet 1

INVENTOR:
ALAN E. BRICKMAN,
BY: John E. Jackson
HIS ATTORNEY.

May 28, 1946.  A. E. BRICKMAN  2,401,045
METHOD OF PRODUCING A RENEWABLE TREAD TIRE
Filed Jan. 8, 1943  2 Sheets-Sheet 2

INVENTOR:
ALAN E. BRICKMAN,
BY: John E. Jackson
HIS ATTORNEY.

Patented May 28, 1946

2,401,045

UNITED STATES PATENT OFFICE 2,401,045

METHOD OF PRODUCING A RENEWABLE TREAD TIRE

Alan E. Brickman, New Haven, Conn., assignor to The American Steel and Wire Company of New Jersey, a corporation of New Jersey Application January 8, 1943, Serial No. 471,755

4 Claims. (Cl. 154—14)

This invention relates to a renewable tread tire having a wire reinforced fabric in the tread portion thereof and to its method of manufacture.

The tires on the market have a unitary tread and shoe portions. When the tread of the tire is worn the tire must be recapped or thrown away. Due to the present shortage of rubber, it is necessary to obtain the maximum mileage from a tire. By making the shoe portion and the tread portion separable, the shoe portion may be made with the desired flexible qualities and when the tread portion becomes worn it may be replaced with a new tread portion. By using the wire reinforced fabric, reclaimed rubber may be safely used in the tread. The reinforced fabric also withstands road heat which causes early deterioration and loss of strength in the usual tire.

An object of this invention is to provide a novel method of producing the improved tread.

The means whereby the present invention achieves the above and other objects will be fully apparent by referring to the following description and attached drawings in which.

Figure 1:
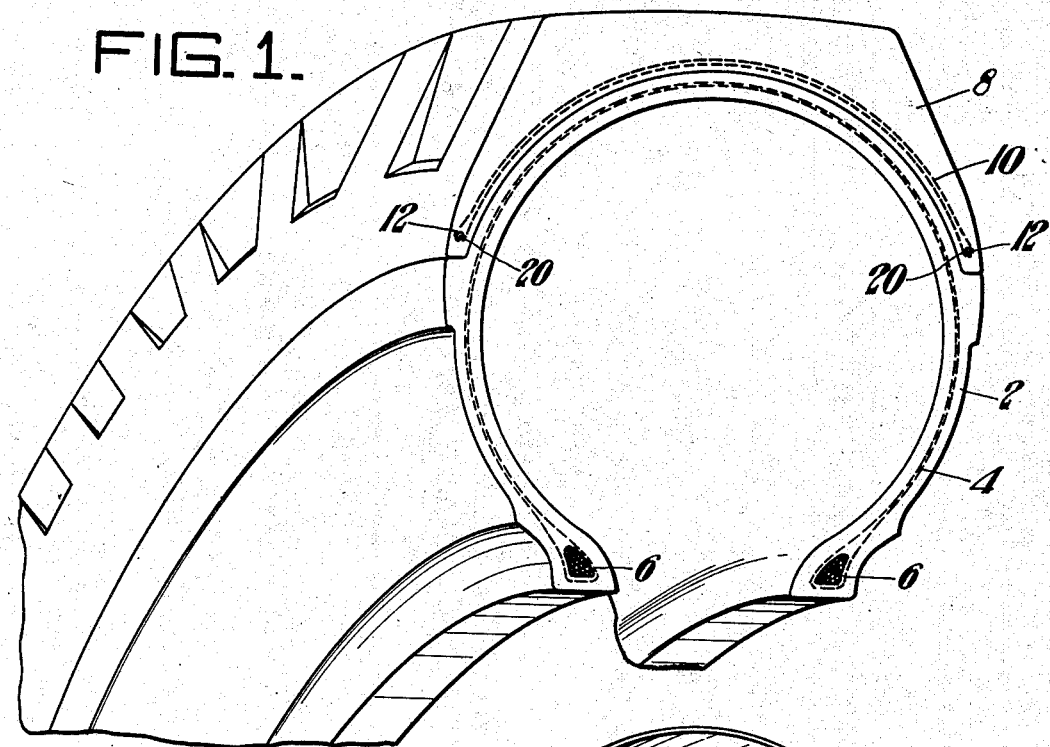
Figure 1 is an isometric cross section of the assembled tire.

Referring more particularly to the drawings, the tire consists of a shoe portion 2 which is of common tire construction and has a relatively soft top as the result of the omission of the tread. Side wall fabric 4 is provided on the side walls to withstand curb contacts and to position the tread. The usual beads 6 are also formed in the shoe portion.

The U-shaped tread portion 8 is formed with the wire reinforced fabric 10 in the base thereof and the beads 12 at the outer end of each leg of the U-shaped tread. The bead wires and reinforcement in the shoe confine the limits and shape it will take under normal inflation as provided by use of a common innertube. The beads 12 and wire reinforced fabric 10, set limits for the tread section under similar inflation. The relation of limits of the tread to the shoe under inflation is such as to place the diametral stresses on the tread fabric. This relation assures follow of the tread with the shoe. In other words the tread follows the shoe instead of moving relatively thereto. An adhesive, comparable to cold pack cement is applied to the areas of the shoe and tread in contact to further unite the two sections and to exclude water and other foreign materials. This adhesive forms a plane of weakness which can be destroyed when it is desired to change treads.

Figure 2:
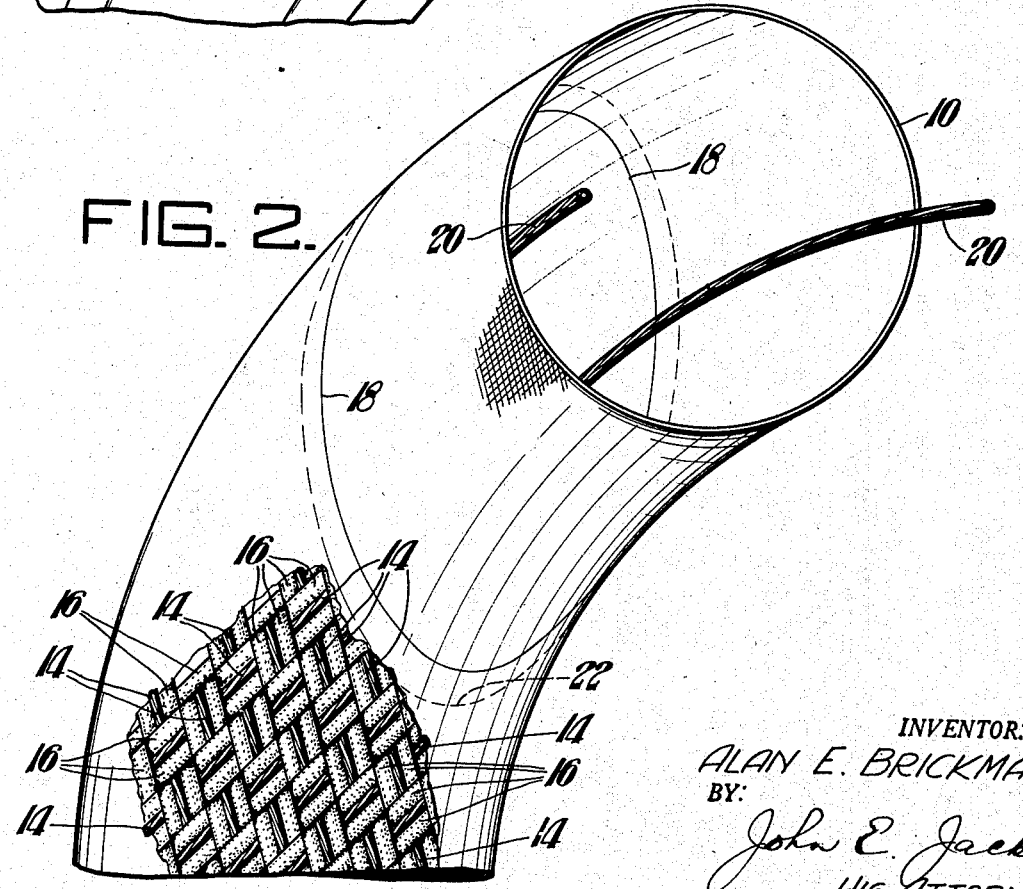
Figure 2 is an isometric view showing the reinforced fabric at one stage in the manufacture of the tread portion.

The fabric 10 is preferably of tubular basket weave in which each thread of the weave has a stranded wire structure 14 between two latex covered cotton cords 16. The stranded structures are coated with "Vulcaloc" or other suitable material which favors adhesion with the gum of the cotton cords. The latex on the cotton cord is sufficient to fill the interstices and cover the outside of the stranded wire structures and so insulate them from frictional contact with each other. Figure 2 shows the cross section of the tubular basket weave as circular, but this shape may be modified as desired.

Figure 3:
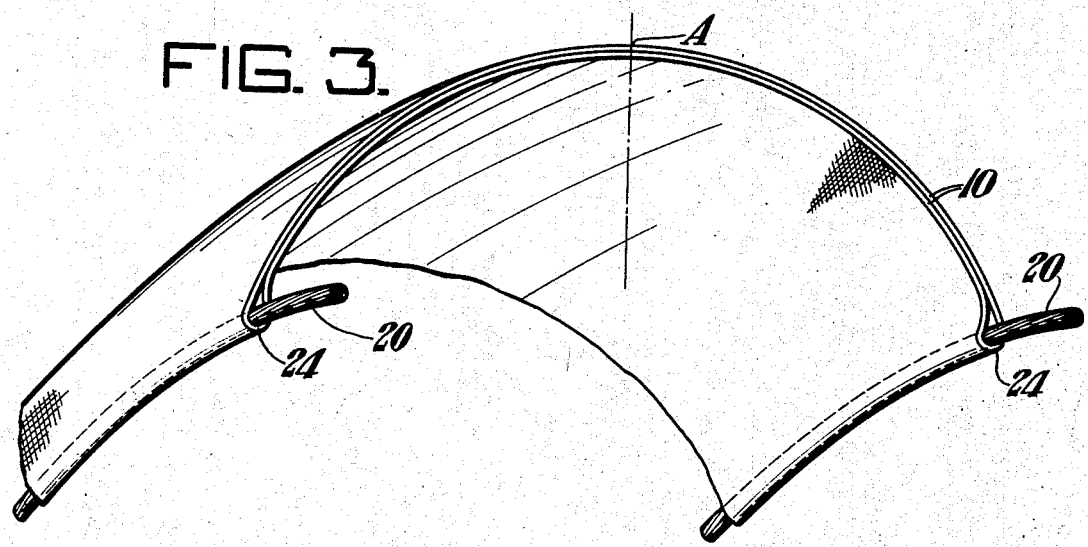
Figure 3 is an isometric view showing the reinforced fabric at a different stage in the manufacture of the tread portion.
Figure 4:
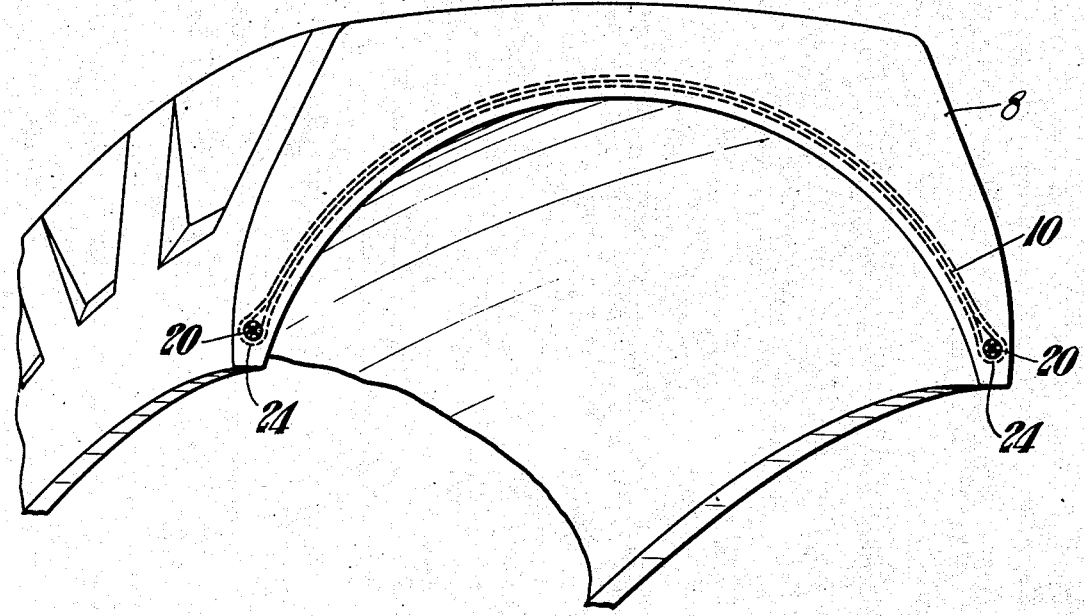
Figure 4 is an isometric view of the completed tread portion.

The tread portion is made as follows:

A length of this tubular fabric is cut on a bias 18 and two stranded bead wires 20 are placed within the tubular structure and welded to form hoops. The hoops 20 are positioned in spaced relation and the bias ends are then lapped as shown and secured in position. The parabolic lap forming the joint has the vertex points 22 on the center line of the assembly in order to provide greatest strength. The inner half of the tubular basket weave is collapsed inwardly and nested into the outer half with the vertex points at A as shown in Figure 3. An expanding band hoop conforming to the internal contour of the tread reinforcement (Figure 3) causes the spaced bead structures 20 to take position in the folds 24. Heat applied in this expanded condition fuses the latex on the cotton cords to form a unit two ply construction. The latex on the cotton cords fills the interstices and covers the outside surface of the stranded structures to insulate them from frictional contact with each other. The rubber of the tread is then added to the reinforced fabric and vulcanized to form the completed tread portion.

While one embodiment of the invention has been shown and described, it will be understood that other modifications and adaptations may be made without departing from the scope of the attached claims.

I claim:

1. The method of making a tread portion for a renewable tread tire which comprises forming a tubular fabric of basket weave, cutting a length of said fabric on a bias, inserting two bead wires within the tubular structure, welding the ends of each bead wire together to form a hoop, lapping the ends of the bias and securing them together, folding the inner portion of said tubular structure against the outer portion thereof with a bead wire at each fold, subjecting said structure to heat to form a unit two-ply construction, applying rubber to said structure and vulcanizing to an approximate U-shape.

2. The method of making a renewable tread tire which comprises forming a tubular fabric of basket weave, cutting a length of said fabric on a bias, inserting two bead wires within the tubular structure, welding the ends of each wire together to form a hoop, lapping the ends of the bias and securing them together, folding the inner portion of said tubular structure against the outer portion thereof with a bead wire at each fold, subjecting said structure to heat to form a unit two-ply construction, applying rubber to said structure and vulcanizing to an approximate U-shape, making a flexible shoe portion having an outer portion shaped to receive the base of the tread portion and fastening the tread portion to the shoe portion.

3. The method of making a tread portion for a renewable tread tire which comprises forming a tubular fabric of basket weave having the desired length, inserting two bead wires within the tubular structure, securing the ends of each bead wire together to form a hoop, lapping the ends of the fabric and securing them together, folding the inner portion of said tubular structure against the outer portion thereof with a bead wire at each fold, applying rubber to said structure and vulcanizing to an approximate U-shape.

4. A method of making a renewable tread tire which comprises forming a tubular fabric of basket weave having the desired length, inserting two bead wires within the tubular structure, securing the ends of each bead wire together to form a hoop, lapping the ends of the fabric and securing them together, folding the inner portion of said tubular structure against the outer portion thereof with a bead wire at each fold, applying rubber to said structure and vulcanizing to an approximate U-shape, making a flexible shoe portion having an outer portion shaped to receive the base of the tread portion, and fastening the tread portion to the shoe portion.

ALAN E. BRICKMAN.